(12) United States Patent
Murakami et al.

(10) Patent No.: US 11,370,207 B2
(45) Date of Patent: Jun. 28, 2022

(54) PACKING MATERIAL FOR SURFACTANT-CONTAINING PRODUCTS

(71) Applicant: TOYO SEIKAN GROUP HOLDINGS, LTD., Tokyo (JP)

(72) Inventors: Takuo Murakami, Yokohama (JP); Shinya Seito, Yokohama (JP); Takayuki Ishihara, Yokohama (JP); Kousuke Ueda, Yokohama (JP); Saya Sugioka, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 16/957,603

(22) PCT Filed: Jan. 16, 2019

(86) PCT No.: PCT/JP2019/001020
§ 371 (c)(1),
(2) Date: Jun. 24, 2020

(87) PCT Pub. No.: WO2019/142805
PCT Pub. Date: Jul. 25, 2019

(65) Prior Publication Data
US 2020/0346447 A1    Nov. 5, 2020

(30) Foreign Application Priority Data
Jan. 16, 2018 (JP) ............................. JP2018-005126

(51) Int. Cl.
*B32B 3/04* (2006.01)
*B32B 27/32* (2006.01)
(Continued)

(52) U.S. Cl.
CPC .............. *B32B 27/32* (2013.01); *B32B 27/08* (2013.01); *B32B 27/308* (2013.01); *B32B 2255/10* (2013.01); *B65D 65/40* (2013.01)

(58) Field of Classification Search
CPC ...... B32B 27/283; B32B 27/308; B32B 27/32
See application file for complete search history.

(56) References Cited

U.S. PATENT DOCUMENTS

| 2003/0008153 A1 | 1/2003 | Migliorini et al. |
| 2014/0147627 A1 | 5/2014 | Aizenberg et al. |

(Continued)

FOREIGN PATENT DOCUMENTS

| JP | 07-004364 A | 1/1995 |
| JP | 2014-509959 A | 4/2014 |

(Continued)

OTHER PUBLICATIONS

International Search Report for PCT/JP2019/001020, dated Mar. 12, 2019.
(Continued)

*Primary Examiner* — Zachary M Davis
(74) *Attorney, Agent, or Firm* — Sughrue Mion, PLLC

(57) ABSTRACT

A packing material for surfactant-containing products includes a solid surface layer (3) that contains a non-aromatic silicone type polymer and a silicone oil layer (1) held on the solid surface layer (3), wherein the non-aromatic silicone type polymer is at least the one kind of polymer selected from a silicone resin, a silicone-modified olefin resin, silicone-modified polysaccharides and a silicone-modified acrylic resin.

5 Claims, 1 Drawing Sheet

(51) Int. Cl.
    *B32B 27/08*     (2006.01)
    *B32B 27/30*     (2006.01)
    *B65D 65/40*     (2006.01)

(56) References Cited

U.S. PATENT DOCUMENTS

| | | |
|---|---|---|
| 2015/0108032 A1 | 4/2015 | Akutsu et al. |
| 2015/0152270 A1 | 6/2015 | Aizenberg et al. |
| 2015/0376535 A1 | 12/2015 | Shiratori et al. |

FOREIGN PATENT DOCUMENTS

| | | |
|---|---|---|
| JP | 2015-531005 A | 10/2015 |
| JP | 2016-011375 A | 1/2016 |
| JP | 5971337 B2 | 8/2016 |
| JP | 2017-094661 A | 6/2017 |
| JP | 6228012 B2 | 11/2017 |
| WO | 93/17077 A1 | 9/1993 |
| WO | 2014/010534 A1 | 1/2014 |
| WO | 2018/094161 A1 | 5/2018 |

OTHER PUBLICATIONS

Extended European Search Report dated Aug. 18, 2021, issued by the European Patent Office in corresponding application No. 19741156.4.

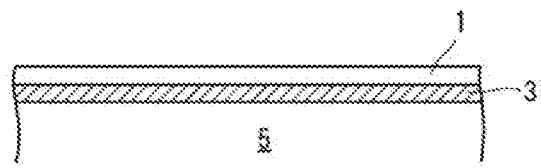

PACKING MATERIAL FOR SURFACTANT-CONTAINING PRODUCTS

This application is a National Stage of International Application No. PCT/JP2019/001020 filed Jan. 16, 2019, claiming priority based on Japanese Patent Application No. 2018-005126 filed Jan. 16, 2018.

TECHNICAL FIELD

This invention relates to a packing material for surfactant-containing products.

BACKGROUND ART

Plastic containers have been widely used in a variety of applications since they are easy to form and inexpensive to produce. Specifically, the olefin resin containers of the shape of a bottle that are direct-blow formed and having inner surfaces formed of an olefin resin such as a low-density polyethylene, are favorably used for containing viscous and slurry or paste-like contents such as ketchup and the like from such a standpoint that the contents can be easily squeezed out.

Moreover, the containers for containing viscous contents must have inner surfaces which are slippery the contents and to which the contents do not adhere, enabling, therefore, the contents to be quickly discharged or the contents to be used up to the last drip without permitting them to remain on the inner surfaces or the lid materials of the containers.

As means for imparting the slipping property and the non-adhering property, in recent years, various methods have been proposed according to which a base material is provided, on the surface thereof, with a liquid layer (lubricating liquid layer) that exhibits slipping property and non-adhering property to a fluid substance that flows on the base material. However, such methods are still accompanied by a problem of how to hold the lubricating liquid maintaining stability without permitting it to flow away.

For example, patent documents 1 and 2 are proposing means of roughening the surfaces of the base materials to stably hold lubricants on the surfaces.

According to these means, however, the resins forming the surfaces of the base materials are blended with fine particles of silica or the like whereby dispersion of the fine particles is reflected on the surfaces thereof accompanied, therefore, by such a problem that it becomes very difficult to control the degree of roughness on the surfaces. There is also a means of forming rough surfaces by treating the surfaces relying on the blast treatment which, however, is not suited in the field of producing containers and still involves difficulty in controlling the degree of roughness on the surfaces maintaining stability.

Further, a patent document 3 proposes an art of forming the surface of a base material by using a polymer that swells upon absorbing a lubricant and letting the lubricant to be absorbed by the polymer in order to stably hold a layer of the lubricant on the surface of the base material.

Moreover, a patent document 4 proposes an art of forming a porous high molecular film on surface of a base material and letting a lubricant to be absorbed in the high molecular film thereby to stably hold a layer of the lubricant on the surface of the base material.

According to the above means by which the lubricant infiltrates into, or is absorbed by, the surfaces of the base materials, however, there remains a problem in that the layer of the lubricant diminishes with the lapse of time. At first, therefore, good slipping property and adhesion-preventing property can be exhibited, which, however, gradually decrease as the time passes by.

On the other hand, a patent document 5 proposes a method of forming a base film having a $\pi$ electron-containing functional group (e.g., aromatic group) on a flat surface of a base material and holing a lubricant (lubricating solution) on the base film.

According to this method, the lubricant is held on the base film not in a manner of being infiltrated into, or absorbed by, the base film. This method, therefore, effectively suppresses such an inconvenience that the layer of the lubricant diminishes with the passage of time. Namely, the slipping property and adhesion-preventing property can be exhibited over extended periods of time.

With this method which holds the lubricant relying on the $\pi$ interaction of the functional group that has the $\pi$ electron, however, the lubricants to be held on the surface are limited to those that are capable of interacting with the $\pi$ electrons; i.e., limitation is imposed on the kinds of the lubricants. According to the study conducted by the present inventors there still remains such a defect that it is not allowed to use, as the lubricant, the silicone oil that exhibits excellent slipping property and adhesion-preventing property to the surfactant-containing substances such as cosmetics, shampoos, etc. For example, the patent document 5 uses a decyltrithoxysilane as the lubricant which, however, is not capable of exhibiting the slipping property or the adhesion-preventing property to the surfactant-containing fluids such as shampoo and the like. The lubricant of this type, presumably, has a high degree of affinity to the surfactant. Upon coming in contact with the substance that contains the surfactant, therefore, the lubricant becomes integral with the substance and is scratched off the surface.

Moreover, the base film that has the $\pi$ electron-containing functional group exhibits an increased surface tension and, therefore, may accelerate the adhesion to the product that is packed. Furthermore, according to the above method, a coating solution that contains a compound (e.g., phenylethoxysilane) having a $\pi$ electron-containing functional group is applied onto the surface of the base material to form the film relying on the coupling reaction of the compound with the surface of the base material. Accordingly, treatment of the base film becomes very complex. To remove the unreacted compounds, for example, the base film that has been formed must be washed with an organic solvent making it difficult to carry out the method on an industrial scale from the standpoint of cost and production facilities.

PRIOR ART DOCUMENTS

Patent Documents

Patent document 1: Japanese Patent No. 5971337
Patent document 2: Japanese Patent No. 6228012
Patent document 3: JP-T-2015-531005
Patent document 4: JP-A-2016-11375
Patent document 5: JP-A-2017-9466

OUTLINE OF THE INVENTION

Problems that the Invention is to Solve

It is, therefore, an object of the present invention to provide a packing material having a surface capable of exhibiting excellent slipping property and adhesion-preventing property to the surfactant-containing products such as cosmetics and the like maintaining stability over extended periods of time.

Another object of the present invention is to provide a packing material for surfactant-containing products, having a surface that easily exhibits the slipping property and adhesion-preventing property upon being applied and dried in an ordinary manner without relying on any specific reaction.

Means for Solving the Problems

According to the present invention, there is provided a packing material for surfactant-containing products comprising a solid surface layer that contains a non-aromatic silicone type polymer and a silicone oil layer held on the solid surface layer, characterized in that the non-aromatic silicone type polymer is at least the one kind of polymer selected from the group consisting of a silicone resin, a silicone-modified olefin resin, silicone-modified polysaccharides and a silicone-modified acrylic resin.

In the packing material of the invention, it is desired that:
(1) The non-aromatic silicone type polymer includes a D-unit represented by the following formula (1):

$$R_2SiO_{2/2} \quad (1)$$

wherein R is a non-aromatic group and, specifically, an alkyl group;
(2) The solid layer has a surface free energy of not more than 35 mJ/m$^2$;
(3) The solid layer has a root mean square roughness Sq of not more than 0.3 μm;
(4) The sol id layer has an average light transmittance of not less than 80% over the wavelengths of 400 to 800 nm;
(5) The solid layer is formed on the surface of a plastic base material, a glass base material, a metal base material or a paper base material;
(6) The packing material is in the form of a container;
(7) The surfactant-containing product is a fluid; and
(8) The surfactant-containing product is a cosmetic.

Effects of the Invention

The packing material of the present invention is used for containing a variety of products blended with the surfactant, which are in the form of fluids such as cosmetics like shampoo, conditioner and the like. The packing material of the invention exhibits excellent adhesion-preventing property and slipping property to the surfactant-containing products. Therefore, the packing material makes it possible to use up these products entirely without permitting them to remain in the packing material and hence eliminating the waste.

In the packing material of the invention, further, the solid surface layer is formed under the silicone oil layer that exhibits the above-mentioned properties to the surfactant, the solid surface layer being formed based on a simple coating method. The solid surface layer is, therefore, formed without executing any particular reaction relative to the surface of the base material that supports the solid layer offering a great advantage in an industrial sense.

Moreover, the solid surface layer contains a specific non-aromatic silicone type polymer, and holds the silicone oil by the surface adsorption based on the intermolecular force. That is, the silicone oil is held neither by forming the solid surface layer rugged nor by forming the solid surface layer porous to absorb the silicone oil. It is, therefore, allowed to evenly and stably hold the silicone oil without permitting it to be absorbed or diminished. Besides, the surface of the solid surface layer needs not be formed rugged but may be a specular surface making it, therefore, possible to secure a high degree of transparency and providing a very great advantage as the packing material.

BRIEF DESCRIPTION OF THE DRAWING

The FIGURE is a side sectional view illustrating an embodiment of the surface of a packing material of the present invention.

MODES FOR CARRYING OUT THE INVENTION

Referring to the FIGURE, the packing material has a silicone oil layer 1 on the surface thereof. The silicone oil layer 1 is held on the surface of a solid surface layer 3 which is provided on the surface of a predetermined base material 5. That is, the packing material of the invention is used to pack the surfactant-containing product in a manner to come in contact with the silicone oil layer 1.

<Silicone Oil Layer 1>

The packing material of the present invention is provided with the silicone oil layer 1 on the surface that comes in contact with the product that is packed, and hence exhibits excellent adhesion-preventing property and slipping property to the surfactant-containing product.

The silicone oil is a fluid having a dynamic viscosity in a range of 2 to 1000 mm$^2$/s at, for example, 25° C. Therefore, the silicone oil is not scratched off by the surfactant present in the product that is packed but remains stable on the sol id surface layer 3 and, besides, exhibits excellent adhesion-preventing property and slipping property to the surfactant-containing product. Here, if the viscosity of the silicone oil is smaller than the above range, then the silicone oil layer 1 tends to be split off the solid surface layer 3 causing the adhesion-preventing property and slipping property to lose stability. If the viscosity of the silicone oil is larger than the above range, on the other hand, the silicone oil acquires decreased fluidity, becomes close to the solid state, and exhibits decreased slipping property to the surfactant-containing product.

The silicone oil having the above-mentioned viscosity is obtained by the polycondensation of, for example, a dialkoxysilane with a trialkoxysilane, and is represented by the following formula, $$(RO)_3Si—(R_2SiO)n-Si(OR)_3$$

wherein R is an alkyl group or a lower alkyl group having not more than 4 carbon atoms, such as methyl group, ethyl group, propyl group or butyl group, and n is a number of the SiO chains that would produce the above-mentioned viscosity.

The invention uses, particularly preferably, a dimethylsilicone oil (R is a methyl group in the above formula) since it is available most inexpensively and easily.

In the invention, it is desired that the silicone oil layer 1 is formed in an amount of, for example, 0.1 to 80 g/m$^2$ and, specifically, 0.5 to 50 g/m$^2$ from such standpoints that the silicone oil is stably held and stably exhibits the above-mentioned properties.

Further, the silicone oil may be the same component as the one that is contained in the surfactant-containing product. Or the silicone oil layer may be formed by the component contained in the surfactant-containing product.

<Solid Surface Layer 3>

In the invention, the solid surface layer 3 contains a non-aromatic silicone type polymer. That is, the silicone polymer has an SiC bond but should not contain at least the aromatic group. The silicone polymer containing the aromatic group exhibits poor affinity to the above-mentioned silicone oil, does not produce sufficiently large intermolecular force to the silicone oil, and is not capable of stably holding the silicone oil layer 1. Besides, if the aromatic group is contained, the surface tension becomes large, so the silicone polymer tends to adhere to the product that is packed. Therefore, excellent slipping property and adhesion-preventing property would extinguish in short periods of time though they could be exhibited in at first.

The silicone polymer is a polymer that has an M-unit, D-unit, a T-unit and a Q-unit as basic constituent units.

The M-unit is a monofunctional unit, expressed by the formula: $R_3SiO_{1/2}$, and is present at a terminal of the silicone molecular chain.

The D-unit is a bifunctional unit and is expressed by the formula: $R_2SiO_2$.

The T-unit is a trifunctional unit and is expressed by the formula: $RSiO_{3/2}$.

The Q-unit is a tetrafunctional unit and is expressed by the formula: $SiO_{4/2}$.

In the above formulas, R is, usually, an organic group. In the present invention, however, the silicone type polymer has no aromatic group. Therefore, the above R is an organic group having no aromatic ring, which, therefore, could be a reactive group such as (meth)acrylic group, epoxy group or isocyanate group. In many cases, however, R is an alkyl group as represented by a methyl group and, specifically, an alkyl group having not more than 4 carbon atoms. Further, R may partly include a hydrogen atom so far as the properties of the silicone polymer are not seriously spoiled.

For instance, the above-mentioned silicone oil, too, is a polymer that belongs to the above-mentioned silicone polymer, and has a linear structure in which the T-unit is bonded to the terminal of the chain of the D-units. Here, the polymer is an oil (liquid) having a low degree of polymerization, and is not capable of forming the solid surface layer 3.

As the non-aromatic silicone type polymer for forming the solid surface layer 3, the invention uses a silicone resin, a silicone-modified olefin resin, silicone-modified polysaccharides, or silicone-modified acrylic resin provided they have no aromatic group.

The silicone resin comprises any of the above-mentioned P-units, D-units, T-units or Q-units. For instance, the so-called MQ resin is a solid polymer having a structure which contains much Q-units as the basic constitution and has the M-units at the terminals. Further, the polymer having the T-units as the basic constitution is called the MT resin. This resin is also called silsesquioxaneoxane, and include the one of a random structure in which the T-units are bonded in a random fashion, the one of a ladder structure in which the T-units are linked like a ladder, and the one of a cage structure in which the T-units are linked like a cage. Moreover, a polymer which chiefly comprises the D-units and the T-unit s is called the DT resin (or the MDT resin), and a polymer of a structure in which a straight chained dialkylpolysiloxane is crosslinked with a polyfunctional silane compound is called the silicone rubber.

The silicone-modified olefin resin is obtained by reacting an olefin resin with a non-aromatic silicone oligomer having a reactive group such as (meth) acrylic group or with a silane coupling agent to thereby introduce a silicone bond into the olefin resin. Specifically, a silicone-modified polynorbornene obtained by introducing a silicone bond into the polynorbornene has been placed in the market by Shin-etsu Silicone Co. in the trade name of NBN-30-ID. Further, a silicone-modified polypropylene and a silicone-modified polyethylene obtained by introducing the silicone bond into the polypropylene and into the polyethylene have been placed in the market by Toray Dow Corning Corp. in the trade names of BY27-201, BY27-201C, BY27-202H, BY27-213, etc.

Silicone-modified polysaccharides are those having a silicone bond introduced therein by reacting a silicone oligomer having a reactive group such as (meth) acrylic group, epoxy group or isocyanate group, or a silane coupling agent with part of the OH group included in a molecular chain of polysaccharides in which a monosaccharide unit is linked to the glucoside bond. The silicone-modified polysaccharides have been placed in the market by Shin-etsu Silicone Co. in the trade name of Silicone-modified. Pullulan TPSL-30-ID.

The silicone-modified acrylic resin is the one that is obtained by copolymerizing an acrylic silicone polymer having a (meth) acrylic group bonded to the terminal of the silicone chain with an acrylic resin.

In the invention, further, it is more desired that the above-mentioned non-aromatic silicone type polymer has the D-unit, i.e., has a bifunctional unit represented by the formula: $R_2SiO_2$ (R is a non-aromatic organic group and, specifically, an alkyl group) This helps increase the intermolecular contact area to the silicone oil that comprises the D-units. Therefore, a larger intermolecular force acts, and the silicone oil can be held more stably. For example, by using a linear polymer having the above-mentioned D-unit, i.e., the bifunctional unit represented by the formula: $R_2SiO_2$ (R is a non-aromatic organic group and, specifically, an alkyl group) as the acrylic silicone polymer that is to be copolymerized, the silicone-modified acrylic resin becomes capable of exhibiting further improved adhesion-preventing property and slipping property.

The solid surface layer 3 may, further, contain other resins such as aromatic silicone resin and other thermoplastic resins in small amounts so far as they do not impair excellent properties of the above-mentioned non-aromatic silicone polymer.

In the invention, the solid surface layer 3 is formed by the above-mentioned non-aromatic silicone type polymer. Therefore, the silicone oil applied thereon is alleviated from being removed. Namely, the silicone oil layer 1 is stably held thereon, and the silicone oil exhibits excellent adhesion-preventing property and slipping property to the surfactant-containing product for extended periods of time.

It is, further, desired that the solid surface layer 3 is formed by the non-aromatic silicone type polymer which is so selected as to have a surface free energy of not more than 35 mJ/m². This permits the silicone oil to wet and spread over the whole surface of the solid surface layer 3 and, therefore, permits the entire silicone oil layer 1 to assume a uniform thickness. The surface free energy, usually, tends to decrease as the solid surface layer 3 becomes rich in silicon. Therefore, the non-aromatic silicone polymer should be selected by utilizing this property.

The solid surface layer 3 of the present invention does not hold the silicone oil layer 1 by being infiltrated or swollen with the silicone oil but holds the silicone oil layer 1 by the intermolecular force to the silicone oil. Therefore, the solid surface layer 3 does not have to be porous or does not, either, need to have its surface roughened. Accordingly, the solid surface layer 3 assumes a smooth surface with its root mean square roughness Sq (in compliance with the ISO 25178) not being more than 0.3 μm. Moreover, due to its smooth surface, the solid surface layer 3 has a high transmittance for visible rays; i.e., the solid surface layer 3 is highly transparent having an average light transmittance of not less than 80% over the wavelengths of 400 to 800 nm.

According to the invention, the solid surface layer 3 can be easily formed by preparing a coating solution by dissolving the above-mentioned non-aromatic silicone type polymer in an alcohol type solvent such as isopropanol, in an ester type solvent such as butyl acetate, or in a low molecular and volatile siloxane type solvent such as polysiloxane, and applying the coating solution onto the surface of the base material 5 followed by drying. That is, due to the presence of the silicone group, the solid surface layer 3 exhibits a high degree of adhesiveness to the surface of the base material 5, and can, therefore, be easily formed by applying the above coating solution thereon. No chemical reaction is executed for the surface of the base material 5. After the layer has been formed, therefore, no step is necessary such as washing for removing the unreacted products.

The coating solution can be applied by any suitable means depending on the form of the base material 5, such as spraying, brushing, dipping or roll-coating.

The solid surface layer 3 can be also formed by such a method as T-die method, calender method or inflation method.

Moreover, a multilayered structure having the solid surface layer 3 and the base material 5 can be formed by such a method as melt coextrusion method or dry lamination method.

The thus formed solid surface layer 3 does not hold the silicone oil layer 1 by being swollen or infiltrated with the silicone oil or by being roughened in the surface thereof. Therefore, the solid surface layer 3 needs have a thickness which is as small as possible, e.g., not more than 10 μm and, specifically, about 0.1 to about 5 μm.

<Base Material 5, Form of the Packing Material>

The base material 5 that has the solid surface layer 3 formed on the surface thereof may be a plastic base material, a glass base material, a metal base material or a paper base material depending on the form of the packing material, and may be made from any material that is adapted to the form of the packing material.

For instance, the packing material may assume the forms of the so-called container, wrapping film and lid material. Most desirably, however, the wrapping material of invention should assume the form of a container since it is used for containing the surfactant-containing products.

The containers are usually bottles and pouches. Therefore, the base material 5 is, preferably, a plastic material and, specifically, a polyolefin or a polyester. The base material may have a multilayered structure that includes, as an intermediate layer, a gas-barrier resin layer such as ethylene-vinyl alcohol copolymer layer or the like layer.

According to the present invention, surfactant-containing products will be the products that are to be packed. Namely, the invention exhibits excellent adhesion-preventing property and slipping property to the products that contain surfactants.

There is no specific limitation on the surfactant-containing products so far as they contain surfactants. Specifically, the products will be fluid cosmetics and, particularly, highly viscous cosmetics such as shampoo, body soap, hand soap, facial wash, hairdressing agent, shaving agent, lotion, beauty essence, conditioner and the like.

Specifically, the packing material of the invention can, most desirably, be used as a refill pouch for containing shampoos and conditioners.

EXAMPLE

The invention will now be described by way of the following Examples.

In the Examples, the silicone oil was a dimethyl silicone oil (KF-96-20cs, dynamic viscosity at 25° C.: 20 mm$^2$/s, produced by Shin-Etsu Chemical Co., Ltd.).

In the following Examples, further, the characteristics were evaluated by the methods described below.

[Measuring the Surface Free Energy of the Solid Surface Layer]

By using an automatic contact angle meter (Drop Master 700 manufactured by Kyowa Interface Science Co., Ltd.), there were measured contact angles of the pure water ($H_2O$) and a diiodomethane ($CH_2I_2$) to the surfaces of the solid layers of the packing materials (films) prepared by the methods that will be described below prior to applying the dimethylsilicone oil thereon.

By using a software (analytic software: FAMAS, name of the analytic theory: Owens-Wendt) attached to the contact angle meter, the surface free energies in the solid layers were calculated from the measured data of contact angles.

For the packing materials that were not forming the solid layers, the surface free energies of the base materials were measured in the same manner.

[Measuring the Surface Roughness]

By using a laser microscope (VK-X260 manufactured by Keyence Corp.), there were measured surface shapes of the solid layers of the packing materials prepared by the methods described below prior to applying the dimethylsilicone oil thereon. Measurements were taken by using an objective lens of a magnifying power of 50 times.

By using a software (multi-file analytic application VK-H1XM produced by Keyence Corp.) attached to the laser microscope, root mean square roughness values Sq were found over a range of 100 μm×100 μm from the obtained three-dimensional shape data.

The values Sq were calculated in compliance with the ISO 25178.

For the packing materials that were not forming the solid layers, the values Sq were measured in the same manner from the surfaces of the base materials.

[Measuring the Visible Ray Transmittance]

By using a spectrophotometer (UV-3100PC manufactured by Shimazu Corporation)), there were measured average light transmittances (%) of the solid layers on the base materials of the packing materials prepared by the methods described below prior to applying the dimethylsilicone oil thereon over the wavelengths of 400 to 800 nm.

[Adhesion-Preventing Property]

The film of the packing material was fixed to a sample plate tilted at 60 degrees, and a shampoo (Pantene Extra Damage Care Shampoo produced by P&G Co.) was dripped on the same part of the film repetitively in an amount of 0.1 g each time from a position about 1 cm away from the surface of the silicone oil layer. The number of times was measured until the shampoo began to remain on the part on where it was dripped. The adhesion-preventing property and slipping property were evaluated based on the number of times the shampoo was dripped.

[Slide-Down Property]

The film of the packing material was fixed to a horizontal sample plate, and the shampoo used above was dripped thereon in an amount of 0.1 g from a position about 1 cm away from the surface of the silicone oil layer. After one minute has passed, the sample plate was gradually tilted, and the slide-down property was evaluated based on an angle at which the shampoo has slid down.

Example 1

As the base material, there was provided an unstretched polypropylene film (RXC-22, 50 μm in thickness, hereinafter CPP, produced by Mitsui Chemicals Tohcello Inc.).

By using a bar coater, a non-aromatic silicone polymer (acrylic silicone KP-543, containing butyl acetate as a solvent, produced by Shin-Etsu Chemical Co., Ltd.) was applied onto the base material. Then by using a vacuum dryer, the non-aromatic silicone polymer was dried at 80° C. for 10 minutes to form a solid layer of a thickness of 2.0 μm.

Next, by using the bar coater, the dimethylsilicone oil was applied onto the acrylic silicone, and a silicone oil layer was formed in an applied amount of 10 g/m² to thereby obtain a packing material.

The packing material was measured for its properties to obtain the following results.
  Solid layer surface free energy: 29.7 mJ m²
  Root mean square roughness Sq: 0.006 μm
  Visible ray transmittance: 90.2%
  Adhesion-preventing property:
  Shampoo; 100 times <
  Slide-down property:
  Shampoo; 10 degrees

Example 2

A packing material was prepared in the same manner as in Example 1 but using a silicone-modified polynorbornene, NBN-30-ID, manufactured by Shin-Etsu Chemical Co., Ltd. as the non-aromatic silicone polymer, and was measured for its properties to obtain the following results.
  Solid layer surface free energy: 27.8 mJ/m²
  Root mean square roughness Sq: 0.005 μm
  Visible ray transmittance: 92.0%
  Adhesion-preventing property:
  Shampoo; 34 times
  Slide-down property:
  Shampoo; 11 degrees

Example 3

A packing material was prepared in the same manner as in Example 1 but using a silicone-modified Pullulan, TSPL-30-ID, manufactured by Shin-Etsu Chemical Co., Ltd. as the non-aromatic silicone polymer, and was measured for its properties to obtain the following results.
  Solid layer surface free energy: 23.8 mJ/m²
  Root mean square roughness Sq: 0.008 μm
  Visible ray transmittance: 92.0%
  Adhesion preventing property:
  Shampoo; 18 times
  Slide-down property:
  Shampoo; 13 degrees

Example 4

A packing material was prepared in the same manner as in Example 1 but using a methylsilicone resin, KR-251, manufactured by Shin-Etsu. Chemical Co., Ltd. as the non-aromatic silicone polymer, and applying the polymer on a glass plate (S-2215, 1000 μm in thickness, produced by Matsunami Glass Co.) to form a solid surface layer. The packing material was measured for its properties to obtain the following results.
  Solid layer surface free energy: 24.6 mJ/m²
  Root mean square roughness Sq: 0.008 μm
  Visible ray transmittance: 92.7%
  Adhesion-preventing property:
  Shampoo; 29 times
  Slide-down property:
  Shampoo; 12 degrees

Comparative Example 1

A packing material was prepared in the same manner as in Example 1 but using a methylphenyisilicone resin, KR-255 (aromatic silicone polymer), manufactured by Shin-Etsu Chemical Co., Ltd. as the silicone polymer, and was measured for its properties to obtain the following results.
  Solid layer surface free energy: 35.2 mJ/m²
  Root mean square roughness Sq: 0.006 μm
  Visible ray transmittance: 95.6%
  Adhesion-preventing property:
  Shampoo; 8 times
  Slide-down property:
  Shampoo; could not be measured (dripped stickily and continued to stick even at an angle of 90 degrees).

Comparative Example 2

A packing material was prepared by applying the dimethylsilicone oil onto the CPP that was the base material but without forming the solid surface layer, and was measured for its properties to obtain the following results.
  Surface free energy: 33.7 mJ/m²
  Root mean square roughness Sq: 0.173 μm
  Visible ray transmittance: 60.1%
  Adhesion-preventing property:
  Shampoo; 3 times
  Slide-down property:
  Shampoo; could not be measured (dripped stickily and continued to stick even at an angle of 90 degrees).

Comparative Example 3

A packing material was prepared in the same manner as in Comparative Example 2 but using a low-density polyethylene film (F1209N, 40 μm in thickness, produced by Ube Maruzen Polyethylene Co.) as the base material, and was measured for its properties to obtain the following results.
  Surface free energy: 35.7 mJ/m²
  Root mean square roughness Sq: 0.049 μm
  Visible ray transmittance: 83.9%
  Adhesion-preventing property:
  Shampoo; 6 times
  Slide-down property:
  Shampoo; could not be measured (dripped stickily and continued to stick even at an angle of 90 degrees).

Comparative Example 4

A packing material was prepared in the same manner as in Comparative Example 2 but using a polyethylene terephthalate film (P-60, 12 μm in thickness, produced by Toray Co.) as the base material, and was measured for its properties to obtain the following results.
  Surface free energy: 50.9 mJ/m²
  Root mean square roughness Sq: 0.050 μm
  Visible ray transmittance: 86.5%

Adhesion-preventing property:
Shampoo; 5 times
Slide-down property:
Shampoo; could not be measured (dripped stickily and continued to stick even at an angle of 90 degrees).

Comparative Example 5

A packing material was prepared in the same manner as in Comparative Example 3 but using an ethylene vinyl alcohol film (EF-F, 12 μm in thickness, produced by Kuraray Co.) as the base material, and was measured for its properties to obtain the following results.
Surface free energy: 44.2 mJ/m$^2$
Root mean square roughness Sq: 0.086 μm
Visible ray transmittance: 89.5%
Adhesion-preventing property:
Shampoo; 3 times
Slide-down property:
Shampoo; could not be measured (dripped stickily and continued to stick even at an angle of 90 degrees).

Comparative Example 6

A packing material was prepared in the same manner as in Comparative Example 3 but using a glass plate (S-2215, 1000 μm in thickness, produced by Matsunami Glass Co.) as the base material, and was measured for its properties to obtain the following results.
Surface free energy: 72.0 mJ/m$^2$
Root mean square roughness Sq: 0.018 μm
Visible ray transmittance: 91.3%
Adhesion-preventing property:
Shampoo; 3 times
Slide-down property:
Shampoo; could not be measured (dripped stickily and continued to stick even at an angle of 90 degrees).

DESCRIPTION OF REFERENCE NUMERALS

1: silicone oil layer
3: solid surface layer
5: base material

The invention claimed is:

1. A container for containing a surfactant-containing product, the container having an inner surface which is a solid surface layer containing a non-aromatic silicone polymer, and a silicone oil layer is held on said solid surface layer, characterized in that:
    said non-aromatic silicone polymer is at least the one kind of polymer selected from the group consisting of a silicone resin, a silicone-modified olefin resin, silicone-modified polysaccharides and a silicone-modified acrylic resin;
    the surfactant-containing product is a fluid;
    the silicone oil layer is formed in an amount of 0.5 to 50 g/m$^2$; and
    the surface of the solid surface layer holding the silicone oil layer has a root mean square roughness Sq of not more than 0.008 μm.

2. The container for containing a surfactant-containing product according to claim 1, wherein said non-aromatic silicone polymer includes a D-unit represented by the following formula (1):

$$R_2SiO_{2/2} \tag{1}$$

wherein R is a non-aromatic group and, specifically, an alkyl group.

3. The container for containing a surfactant-containing product according to claim 1, wherein said solid layer has a surface free energy of not more than 35 mJ/m$^2$.

4. The container for containing a surfactant-containing product according to claim 1, wherein said solid layer has an average light transmittance of not less than 80% over the wavelengths of 400 to 800 nm.

5. The container for containing a surfactant-containing product according to claim 1, wherein said solid layer is formed on the surface of a plastic base material, a glass base material, a metal base material or a paper base material.

* * * * *